United States Patent
Russo et al.

(10) Patent No.: US 6,276,864 B1
(45) Date of Patent: Aug. 21, 2001

(54) ASSEMBLY FOR CONNECTING A MEASURING TOOL TO A MEASURING HEAD MOVED BY A MEASURING ROBOT

(75) Inventors: Domenico Russo, Moncalieri; Domenico Sola, Rivalta, both of (IT)

(73) Assignee: Brown & Sharpe DEA S.p.A., Moncalieri (IT)

( * ) Notice: Subject to any disclaimer, the term of this patent is extended or adjusted under 35 U.S.C. 154(b) by 0 days.

(21) Appl. No.: 09/321,123

(22) Filed: May 27, 1999

(30) Foreign Application Priority Data

May 29, 1998 (IT) ................................................ T098A0462

(51) Int. Cl.[7] ............................. F16B 21/00; B25J 17/00; B25J 17/02
(52) U.S. Cl. ........................................ 403/322.1; 403/322.1; 403/327; 403/13; 403/14; 403/15; 403/328; 901/10; 901/28; 901/29; 901/41
(58) Field of Search ................................. 403/31, 13, 14, 403/15, 328, 322.3; 901/29, 28, 41

(56) References Cited

U.S. PATENT DOCUMENTS

| | | | | |
|---|---|---|---|---|
| 4,517,055 | * | 5/1985 | Dove | 403/328 X |
| 4,617,951 | * | 10/1986 | Adams et al. | 403/322 X |
| 4,636,135 | * | 1/1987 | Bancon | 403/325 X |
| 4,676,142 | * | 6/1987 | McCormick et al. | 901/29 X |
| 4,700,932 | * | 10/1987 | Katsuno | 901/29 X |
| 4,793,053 | * | 12/1988 | Zuccaro et al. | 403/328 X |
| 4,809,747 | * | 3/1989 | Choly et al. | 901/41 X |
| 4,828,035 | * | 5/1989 | McInturff | 403/322 X |
| 4,906,123 | * | 3/1990 | Weskamp et al. | 403/325 X |
| 5,184,810 | * | 2/1993 | Lebrecht | 269/309 |
| 5,243,264 | * | 9/1993 | Takada et al. | 403/328 X |
| 5,271,686 | * | 12/1993 | Herring, Jr. et al. | 403/13 |
| 6,047,612 | * | 4/2000 | McMurtry | 901/29 X |

FOREIGN PATENT DOCUMENTS

| | | |
|---|---|---|
| 01518189 | 8/1985 | (EP) . |
| 0508598 | 10/1992 | (EP) . |
| 2176136 | * 5/1986 | (GB) . |
| 2176136 | 12/1986 | (GB) . |
| 775906 | 9/1993 | (JP) . |

* cited by examiner

*Primary Examiner*—Lynne H. Browne
*Assistant Examiner*—Ernesto Garcia
(74) *Attorney, Agent, or Firm*—Hall, Priddy, Myers & Vande Sande

(57) ABSTRACT

An assembly for connecting a measuring tool to a measuring head moved by a measuring robot and having an output member rotating at least about one axis; the assembly having three supports located peripherally with respect to the axis and defining an isostatic constraint between the output member and a connecting portion for connecting the tool to the head; the assembly having releasable locking means interposed between the connecting portion of the tool and the output member; and the releasable locking means having engaging means located substantially along the axis, and a pneumatic actuating member cooperating with and for controlling release of the engaging means.

8 Claims, 2 Drawing Sheets

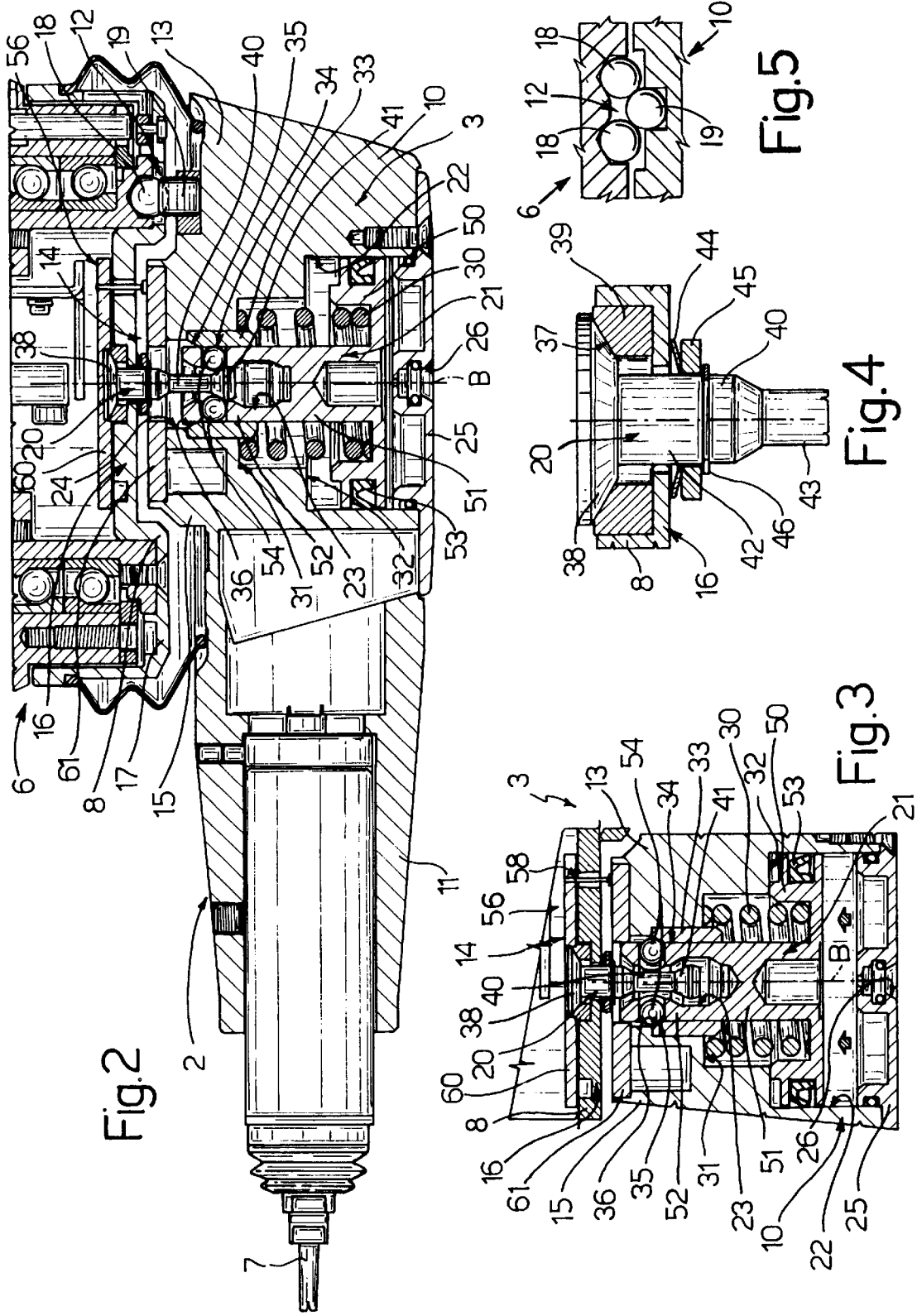

ASSEMBLY FOR CONNECTING A MEASURING TOOL TO A MEASURING HEAD MOVED BY A MEASURING ROBOT The present invention relates to an assembly for connecting a measuring tool to a measuring head moved by a measuring robot.

In the following description and in the claims, the term measuring "head" is used in the widest sense to indicate any unit featuring a measuring stylus, regardless of configuration or number of axes. Similarly, the term "robot" is used to indicate any unit for moving a measuring head along a number of coordinate axes, regardless of configuration or number of axes.

The invention may be used conveniently, but not exclusively, for connecting a measuring tool to a two-axis articulated head (sometimes referred to as "wrist") moved by a measuring robot.

BACKGROUND OF THE INVENTION

To ensure precise measurements, with no need for long, painstaking calibration procedures whenever the measuring tool is fitted to the measuring head, the connecting assembly must provide for repeatable, unmistakable positioning of the tool with respect to the head.

For this purpose, connecting assemblies are known comprising first supporting elements carried by the measuring tool; second supporting elements carried by an output member of the measuring head and cooperating with the first supporting elements to accurately define the position of the tool with respect to the measuring head; and releasable locking members for maintaining the tool and head in said position. Since the locking members normally require the use of tools to lock and release the measuring tool, assembly and disassembly of the measuring tool are relatively long, painstaking jobs.

Magnetic connecting assemblies between the tool and the output member of the measuring head are also known, which provide for relatively fast assembly and disassembly of the tool, but are affected by any external magnetic fields or dirt.

Moreover, magnetic connections require an extensive interaction region between the output member and the tool, so that the exchanged forces distributed over the entire interaction region have a fairly long arm with respect to the axis of rotation of the output member, and which produces interaction moments which make it difficult to ensure perfectly repeatable support of the tool on the head.

SUMMARY OF THE INVENTION

It is an object of the present invention to provide a connecting assembly permitting maximum positioning precision and repeatability, and which at the same time is fast and easy to use and, in particular, provides for assembling and disassembling the measuring tool rapidly with no tools required.

According to the present invention, there is provided an assembly for connecting a measuring tool to a measuring head moved by a measuring robot and having an output member rotating at least about one axis; the assembly comprising first supporting means carried by the output member; second supporting means carried by a connecting portion for connecting the tool to the measuring head, and which cooperate with the first supporting means; and releasable locking means interposed between the connecting portion of the tool and the output member to keep the first supporting means and the second supporting means contacting each other; characterized in that the first and the second supporting means are located peripherally with respect to the axis and define an isostatic constraint between the output member and the connecting portion of the tool; and in that the releasable locking means comprise engaging means located substantially along the axis, and pneumatic actuating means cooperating with and for controlling release of the engaging means.

BRIEF DESCRIPTION OF THE DRAWINGS

A preferred, non-limiting embodiment of the present invention will be described by way of example with reference to the accompanying drawings, in which:

FIG. 2 shows a larger-scale, partially sectioned view of the connecting assembly according to the invention, and of respective associated portions of the measuring tool and measuring head;

FIG. 3 shows a section of a detail of the FIG. 2 connecting assembly in a different operating position;

FIG. 4 shows a larger-scale section of a further detail of the FIG. 2 connecting assembly.

FIG. 5 is a partial sectional view of the ball and cylinder arrangement of FIG. 2.

DETAILED DESCRIPTION OF THE INVENTION

Figure 1:
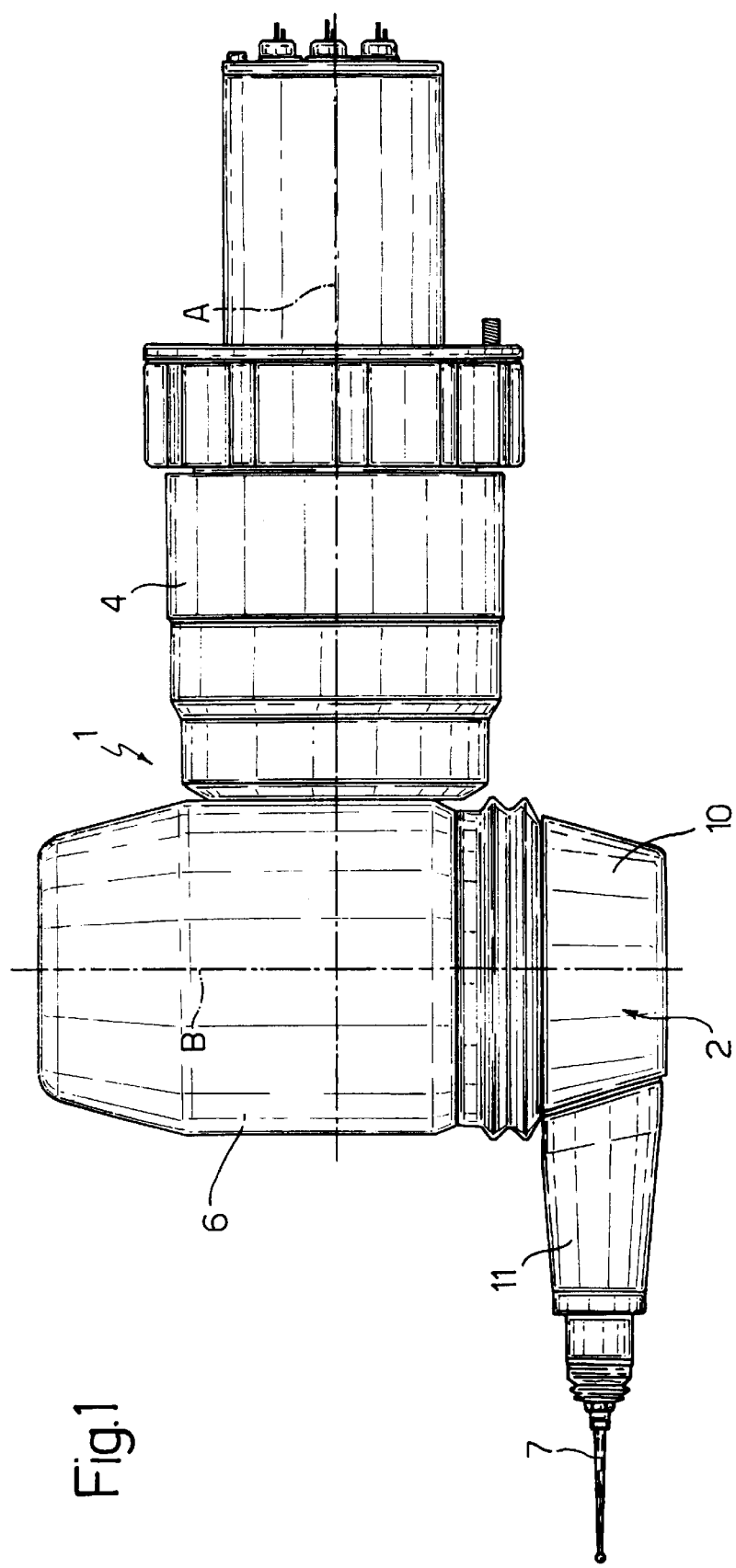
FIG. 1 shows an elevation of a measuring head fitted with a measuring tool by means of a connecting assembly in accordance with the teachings of the present invention.

Number 1 in FIG. 1 indicates as a whole a measuring head, which is moved by a known measuring robot (not shown), and to which a measuring tool 2 is connectable by means of an assembly 3 (FIGS. 2 and 3) forming the object of the present invention.

Head 1 comprises in known manner a substantially tubular first body 4, of axis A, which is connected to said measuring robot; and a second body 6, which has an axis B perpendicular to axis A, is supported in projecting manner by body 4, and is rotated with respect to body 4 and about axis A by a first known actuating and control device (not shown) housed inside body 4.

Tool 2 comprises a known stylus 7—not forming part of the present invention and therefore not described in detail—and is connected in projecting manner, by means of assembly 3, to an end plate 8 carried by body 6 and defining the output member of head 1 (FIGS. 2 and 3).

Plate 8, together with tool 2, is rotated with respect to body 6 and about axis B by a second actuating and control device (not shown) housed inside body 6.

Tool 2 comprises a substantially truncated-cone-shaped connecting portion 10, of axis B, which is connected to plate 8 of head 1 by assembly 3; and a supporting portion 11 supporting stylus 7 and extending laterally from connecting portion 10.

With reference to FIGS. 2 and 3, connecting assembly 3 substantially comprises three supports 12 equally spaced angularly and interposed between plate 8 and the end 13 of connecting portion 10 of tool 2 facing plate 8; and releasable locking means 14 interposed between plate 8 and connecting portion 10, and located substantially along axis B.

More specifically, end 13 of connecting portion 10 has a substantially cylindrical central appendix 15 projecting towards a substantially circular intermediate portion 16 of plate 8, which portion 16 is set back slightly with respect to an annular peripheral portion 17 of plate 8.

Each support 12 is defined by two balls 18 spaced apart and fitted to peripheral portion 17 of plate 8; and by a cylinder 19, which is fitted in projecting manner to end 13 of connecting portion 10 of tool 2, in a peripheral position with respect to appendix 15 and axis B and with its own axis parallel to axis A, and which cooperates with and defines respective contact points with the two balls 18.

Balls 18 and cylinders 19 are housed partly inside respective locating seats formed respectively in peripheral portion 17 of plate 8 and in end 13 of connecting portion 10 of tool 2, and are conveniently fixed by means of adhesive.

The three supports 12 combine to define, between plate 8 and connecting portion 10, an isostatic constraint, which eliminates any degree of freedom of tool 2 with respect to plate 8, with the exception of translation in the direction of axis B.

Releasable locking means 14 comprise a rod 20, of axis B, carried in projecting and orientable manner by intermediate portion 16 of plate 8; and an actuating member 21, which slides in sealed manner inside a through seat 22, of axis B, in connecting portion 10 of tool 2, comprises an end <seat 23 engaged by rod 20, and is movable between a release position (FIG. 3) enabling rod 20 to be inserted into and removed from seat 23, and a lock position axially locking rod 20 inside seat 23 (FIG. 2).

More specifically, seat 22 in connecting portion 10 comprises, towards plate 8, an opening 24 for the insertion of rod 20, is sealed at the opposite end by a cover 25 having an air inlet 26 and fitted to connecting portion 10 by means of screws, and defines, with actuating member 21 and cover 25, a pneumatic actuating cylinder.

Actuating member 21 is loaded axially towards cover 25 and maintained in the lock position by a spring 30, and is moved axially into the release position by compressed air fed through air inlet 26 and acting in the opposite direction to spring 30. Spring 30 is conveniently a cylindrical coil spring housed coaxially inside seat 22 of connecting portion 10.

Working downwards from end 13 of connecting portion 10, seat 22 comprises three successive portions increasing in section and defining two annular shoulders 31, 32 facing cover 25 and respectively adjacent to opening 24 and cover 25.

Adjacent to opening 24, the lateral surface of seat 22 is fitted with a ring 33, of axis B, projecting inside seat 22. Ring 33 is defined internally by a cylindrical surface 34 connected to the lateral surface of seat 22 by a conical end surface 35 facing opening 24 and defining a shoulder 36 with the lateral surface of seat 22.

With particular reference to FIGS. 2 to 4, rod 20 comprises a substantially hemispherical first end head 38, which is mounted on a respective complementary surface of a ring 39 fitted to intermediate portion 16 of plate 8 on the opposite side to tool 2, and defines, with said surface, a spherical articulated joint 37 permitting small misalignments of rod 20 with respect to axis B.

The rod also comprises a shank 40 extending from head 38 through a through opening in intermediate portion 16 of plate 8, and terminating with a second end head 41 substantially in the form of a double truncated cone. More specifically, shank 40 comprises a cylindrical first portion 42 adjacent to head 38; and a cylindrical second portion 43, which is interposed between portion 42 and head 41, is smaller in section than portion 42 and head 41, and is connected to head 41 by a truncated-cone-shaped portion.

Head 38 of rod 20 is maintained contacting the seat in ring 39 by a Belleville washer 44 interposed between intermediate portion 16 of plate 8 and a washer 45 engaged by portion 42 of shank 40 and retained to portion 42 by a retaining ring 46 (FIG. 4).

With reference to FIGS. 2 and 3, actuating member 21 comprises a substantially cylindrical-cup-shaped first portion 50 fitted to slide in sealed manner inside seat 22 of connecting portion 10, between shoulder 32 and cover 25; and an elongated cylindrical second portion 51, which projects from a bottom wall of portion 50, is smaller in section than portion 50, engages ring 33 in sliding manner, and has seat 23 at a free end portion 52. A sealing ring 53 is interposed between portion 50 of actuating member 21 and the lateral surface of seat 22, and is housed inside an outer annular groove on portion 50. Spring 30 has one end housed inside portion 50, is wound about portion 51, and has the opposite end resting against shoulder 31.

End portion 52 of actuating member 21 also comprises a number of balls 54 housed in sliding manner inside respective radial through seats, which are formed in portion 52, communicate with seat 23, are equally spaced about axis B, and are smaller, perpendicular to axis B, than the diameter of balls 54.

Balls 54 are movable between an engaged position—corresponding to the lock position of actuating member 21—in which they are maintained engaging head 41 of rod 20 by interaction with the cylindrical surface 34 of ring 33 (FIG. 2), and a release position—corresponding to the release position of actuating member 21—in which they engage shoulder 36 and are therefore detached from rod 20 to enable rod 20 to be removed from or inserted inside seat 23 (FIG. 3).

Assembly 3 also comprises a known safety or anticrash system 56 for detecting any collision of measuring tool 2 such as to impair the measuring precision of the tool.

With particular reference to FIG. 3, system 56 substantially comprises an electric circuit (not shown) defining a conducting path comprising three normally-closed switches 58 (only one shown in FIGS. 2 and 3) in series with one another and which open in the event of collision; and known detecting means (not shown) for detecting the integrity of the conducting path.

More specifically, each switch 58 is defined by a respective push rod, which is fitted at a first end to a first printed circuit board 60 fitted to intermediate portion 16 of plate 8 on the opposite side to tool 2, and rests at the opposite end on a pad of a second printed circuit board 61 fitted to appendix 15 of connecting portion 10 of tool 2.

Operation of connecting assembly 3—which is partly self-explanatory from the foregoing description—is as follows.

Before tool 2 is fitted to plate 8 of head 1, compressed air must be fed through air inlet 26 into seat 22 of connecting portion 10 to overcome the force of spring 30 and move actuating member 21 from the lock position—in which balls 54 project inside seat 23 and prevent insertion of rod 20—to the release position— in which balls 54 engage shoulder 36 between ring 33 and the lateral surface of seat 22 and so permit insertion of rod 20 inside seat 23 of actuating member 21. The above operation may be performed either manually, by connecting a compressed air supply nozzle (not shown) to air inlet 26, or automatically by connecting to inlet 26 a compressed air supply device integrated with a tool store of the measuring robot.

At this point, tool 2 is moved towards body 6 so that cylinders 19 contact the respective pairs of balls 18 and, at the same time, rod 20 is inserted inside seat 23 of actuating member 21. The orientability of rod 20 and the presence of supports 12 provide, at this stage, for automatically centering tool 2 with respect to plate 8 and, therefore, with respect to measuring head 1.

When the compressed air supply to seat 22 is cut off, spring 30 pushes actuating member 21 into the lock position, and, as end portion 52 slides inside ring 33, balls 54 interact with cylindrical surface 34 of ring 33 and are pushed into engagement with head 41 of rod 20 to lock connecting portion 10 of tool 2 to plate 8 (FIG. 2).

Tool 2 is removed from head 1 in the same way, by feeding compressed air into seat 22 of connecting portion 10 to move actuating member 21 into the release position (FIG. 3) and, once the release position is reached, by moving tool 2 along axis B to withdraw rod from seat 23 of actuating member 21.

The advantages of connecting assembly 3 according to the present invention will be clear from the foregoing description.

In particular, tool 2 is fitted to and removed from measuring head 1 quickly and easily, either by hand or automatically, and with no tools required, by simply feeding compressed air through air inlet 26 into seat 22 of connecting portion 10 of tool 2.

Moreover, maximum positioning repeatability is guaranteed by the isostatic constraint defined by supports 12, and by tool 2 being locked to head 1 substantially along axis B, so that the forces exchanged have a minimum arm with respect to axis B.

Finally, in use, rod 20 is subjected to no radial thrust by virtue of being fitted in floating manner to plate 8.

Clearly, changes may be made to assembly 3 without, however, departing from the scope of the accompanying claims.

What is claimed is:

1. An assembly for connecting a measuring tool to a measuring head movable by a measuring robot, wherein said assembly comprises: an output member rotatable at least about one axis; a first supporting means carried by said output member; a second supporting means carried by a connecting portion for connecting said tool to said measuring head and being capable of cooperating with said first supporting means; and a releasable locking means interposable between said connecting portion and said output member to maintain said first supporting means and said second supporting means in contact with each other; said first and said second supporting means are located peripherally with respect to said axis and define an isostatic constraint between said output member and said connecting portion; and said releasable locking means comprises an engaging means located substantially along said axis, and a pneumatic actuating means for cooperating with and for controlling release of said engaging means;

wherein said first and said second supporting means define three supports equally spaced angularly about said axis, and wherein each of said three supports comprises a pair of balls spaced apart and a cylinder comprised of a surface which cooperates with said balls.

2. An assembly as claimed in claim 1 characterized in that said pneumatic actuating means comprises an actuating member slidably mounted along said axis inside a first seat formed in said connecting portion and maintaining a sealed relationship therewith; and said engaging means comprises a rod carried in a projecting manner by said output member and extending coaxially with said axis, and coupling means which are carried by said actuating member and which engage said rod in a locked position of said actuating member and which are detached from said rod by said actuating member moving into a release position.

3. An assembly as claimed in claim 2 characterized in that said rod comprises a first end head defining, with a respective surface of said output member, a spherical articulated joint permitting small misalignments of said rod with respect to said axis.

4. An assembly as claimed in claim 2 characterized in that said releasable locking means further comprises a spring housed in said first seat and interposed between a first shoulder of said first seat and said actuating member and wherein said spring exerts axial thrust on said actuating member to keep said actuating member in said locked position.

5. An assembly as claimed in claim 2 characterized in that said actuating member comprises an end portion which defines an axial seat engaged by said rod and carries said coupling means.

6. An assembly as claimed in claim 5 characterized in that said rod comprises a shank extending from a first end head and terminating with a second end head projecting radially at least with respect to an adjacent portion of the shank; said first seat having an engaging portion in which said end portion of said actuating member is mounted in a sliding manner and which defines said engaging portion a second shoulder with an adjacent portion of the first seat located towards said output member; said coupling means comprising a number of balls which are equally spaced about said axis; said balls are housed in a sliding manner inside respective radial through seats formed on said end portion of said actuating member; said balls communicate with said axial seat, and which are movable between an engaged position which said portion corresponds to said locked position of said actuating member and said balls engage said second end head of said rod by interacting with said engaging portion of said first seat, and a release position of said actuating member in which said balls engage said second shoulder and said balls are disengaged from said rod to permit insertion or removal of the rod.

7. An assembly as claimed in claim 2 characterized in that said connecting portion has an air inlet communicating with said first seat.

8. An assembly as claimed in claim 7 characterized in that said releasable locking means further comprises a spring and wherein said air inlet is located on the opposite side of said actuating member from said spring.

* * * * *